United States Patent [19]

Baskis

[11] Patent Number: 5,543,061
[45] Date of Patent: *Aug. 6, 1996

[54] REFORMING PROCESS AND APPARATUS

[76] Inventor: Paul T. Baskis, 723 Galaxy St., Rantoul, Ill. 61866

[*] Notice: The term of this patent shall not extend beyond the expiration date of Pat. No. 5,360,530.

[21] Appl. No.: 332,346

[22] Filed: Oct. 31, 1994

Related U.S. Application Data

[63] Continuation-in-part of Ser. No. 110,290, Aug. 20, 1993, Pat. No. 5,360,553, which is a continuation-in-part of Ser. No. 946,939, Sep. 17, 1992, Pat. No. 5,269,947.

[51] Int. Cl.$^6$ ................................................ B01D 35/18
[52] U.S. Cl. ....................... 210/774; 210/806; 210/180; 210/181; 210/770; 201/2.5; 585/240; 48/209; 95/266
[58] Field of Search ................................ 210/774, 770, 210/806, 180, 181, 761, 769; 201/2.5; 585/240; 48/209; 95/266

[56] References Cited

U.S. PATENT DOCUMENTS

| | | |
|---|---|---|
| 59,004 | 10/1866 | Green . |
| 1,950,811 | 3/1934 | Pier . |
| 2,054,725 | 9/1936 | Greenstreet . |
| 2,412,879 | 12/1946 | Fischer . |
| 3,304,991 | 2/1967 | Greenfield . |
| 3,595,742 | 7/1971 | Hess et al. . |
| 3,674,433 | 7/1972 | Wyatt . |
| 3,733,233 | 5/1973 | Appell . |
| 3,750,600 | 8/1973 | Ohsol et al. . |
| 3,875,357 | 4/1975 | Foster et al. . |
| 3,956,126 | 5/1976 | Streebirl et al. . |
| 3,983,182 | 9/1976 | Lagow . |
| 4,013,516 | 3/1977 | Greenfield et al. . |
| 4,038,152 | 7/1977 | Atkins . |
| 4,052,292 | 10/1977 | Espensheld et al. . |
| 4,078,973 | 3/1978 | Choi et al. . |
| 4,097,378 | 6/1978 | St. Clair . |
| 4,098,649 | 7/1978 | Redker . |
| 4,108,730 | 8/1978 | Chem et al. . |
| 4,118,281 | 10/1978 | Yan . |
| 4,118,282 | 10/1978 | Wallace . |
| 4,147,593 | 4/1979 | Frischmuth et al. . |
| 4,175,211 | 11/1979 | Chem et al. . |
| 4,203,838 | 5/1980 | Shimizu et al. . |
| 4,260,473 | 4/1981 | Bauer . |
| 4,271,326 | 6/1981 | Mego . |
| 4,280,817 | 7/1981 | Chauhan et al. . |
| 4,289,625 | 9/1981 | Tarman et al. . |
| 4,321,150 | 3/1982 | McMullen . |
| 4,321,151 | 3/1982 | McMullen . |
| 4,344,770 | 8/1982 | Capener et al. . |
| 4,364,745 | 12/1982 | Weil . |
| 4,365,975 | 12/1982 | Williams . |
| 4,408,999 | 10/1983 | Madkari Ctol . |
| 4,430,160 | 2/1984 | DuBow . |
| 4,515,659 | 5/1985 | Wingfield, Jr. et al. . |

(List continued on next page.)

FOREIGN PATENT DOCUMENTS

| | | |
|---|---|---|
| B22130476 | 4/1979 | Germany . |
| B22609330 | 5/1980 | Germany . |
| A208965 | 4/1984 | Germany . |
| A3734091 | 4/1988 | Germany . |

*Primary Examiner*—Ana Fortuna
*Attorney, Agent, or Firm*—Wallenstein & Wagner, Ltd.

[57] ABSTRACT

This disclosure relates to a processor comprising means (10,11,12,110,111,112) for mixing a process material with a process liquid (13,113) (such as water) and forming an emulsion or slurry. Means (17,18,21,24,117,120,230,420) is provided for pressuring (16,26,116,126) and heating (61,36, 173,227) the slurry, and the slurry is then fed to means (28,128,320,420) for reducing the pressure (27,127) to the slurry or emulsion and for further increasing the temperature (33,227) of the slurry or emulsion. The drop in pressure and increase in temperature causes components of the slurry or emulsion to convert to gases and separate from the remainder of the slurry or emulsion which is removed from the processor in the form of solids (32,132). The gas is fed to one or more condensers (10,63,64,65,177,178) which separate the gas into useful liquids such as various grades of oil.

14 Claims, 5 Drawing Sheets

U.S. PATENT DOCUMENTS

| | | |
|---|---|---|
| 4,552,621 | 11/1985 | Lijakhevich et al. |
| 4,618,735 | 10/1986 | Bridle et al. |
| 4,636,318 | 1/1987 | Baker. |
| 4,657,681 | 4/1987 | Hughes et al. |
| 4,795,841 | 1/1989 | Elliott et al. |
| 4,826,573 | 5/1989 | Schippers. |
| 4,842,692 | 6/1989 | Baker. |
| 4,842,728 | 6/1989 | Baker. |
| 4,861,490 | 8/1989 | Morris. |
| 4,871,426 | 10/1989 | Lechert et al. |
| 4,891,459 | 1/1990 | Knight et al. |
| 4,897,205 | 1/1990 | Landry. |
| 4,923,604 | 5/1990 | Baker. |
| 4,935,038 | 6/1990 | Wolf. |
| 4,938,876 | 7/1990 | Ohsol. |
| 4,941,952 | 7/1990 | Betz. |
| 4,950,309 | 8/1990 | Schulz. |
| 4,971,703 | 11/1990 | Sealock, Jr. et al. |
| 4,981,579 | 1/1991 | Paspek et al. |
| 5,269,947 | 12/1993 | Baskis. |
| 5,360,553 | 11/1994 | Baskis ................. 210/774 |

REFORMING PROCESS AND APPARATUS

REFERENCE TO RELATED APPLICATIONS

This is a continuation-in-part application from U.S. Ser. No. 08/110,290, filed Aug. 20, 1993, for a REFORMING PROCESS AND APPARATUS now U.S. Pat. No. 5,360,553, which is a continuation-in-part application from U.S. Ser. No. 07/946,939, filed Sep. 17, 1992, for a REFORMING PROCESS AND APPARATUS which issued on Dec. 14, 1993 as U.S. Pat. No. 5,269,947.

TECHNICAL FIELD

This invention relates generally to chemical reforming apparatuses and processes, and more particularly to thermal depolymerization processors for converting organic and/or inorganic materials into different, more usable products.

BACKGROUND PRIOR ART

Numerous systems have been proposed in the past for converting waste materials into useful products. For example, the following listed U.S. patents describe systems which purport to convert organic waste materials into useful products such as oil and gas:

| NUMBER | PATENTEE | DATE |
|---|---|---|
| 4,108,730 | CHEN et al. | 08/22/78 |
| 4,175,211 | CHEN et al. | 11/20/79 |
| 4,118,281 | YAN | 10/03/78 |
| 4,935,038 | WOLF | 06/19/90 |
| 4,636,318 | BAKER | 01/13/87 |
| 4,842,692 | BAKER | 06/27/89 |
| 4,842,728 | BAKER | 06/27/89 |
| 4,923,604 | BAKER | 05/08/90 |

Further, Shimizu, U.S. Pat. No. 4,203,838 describes a system for processing sludge, and Ohsol, U.S. Pat. No. 4,938,876 describes a system for separating oil, gas and solids.

It is a general object of the present invention to provide improved processes for converting a process material such as organic materials (coal and/or organic waste) and inorganic materials into useful oils, gases and solids.

SUMMARY OF THE INVENTION

Generally, in a first embodiment, a processor in accordance with this invention is shown that comprises means for mixing a process material with a process liquid (such as water) and forming an emulsion or slurry (the terms emulsion and slurry being used interchangeably to describe the material being worked upon in the process or processor). Means is provided for pressuring and heating the slurry, and the slurry is then fed to means for quickly reducing the pressure to a relatively low value and further increasing the temperature. The rapid drop in pressure and increase in temperature causes components of the slurry to reform chemically and convert to volatile gas and separate from the remainder of the slurry which is removed from the processor in the form of solids. The gas is fed to one or more condensers which separate the gas into useful liquids such as various grades of oil.

In a second embodiment, a processor and method are disclosed for converting a process material into other useful products that includes a hopper connected to a material input conduit which receives and preheats the process material. A separate liquid tank is connected to a liquid input conduit for receiving a process liquid, such as water. The material input conduit and the liquid input conduit are connected to a mixing joint or mixing chamber and a pump for mixing the process material with the process liquid to form a flowable slurry for passing the slurry into a first slurry conduit. The first slurry conduit is connected to a first reactor.

The first reactor is adapted for receiving the slurry, for heating the slurry to a first preestablished temperature and for applying a first pressure to the slurry. A second reactor is connected to the first reactor and is adapted for receiving and reducing the pressure applied to the slurry to a second preestablished pressure, for heating the slurry to a second preestablished temperature, and for reforming the slurry into a first by-product and at least one second by-product. First collection means are attached to the second reactor for receiving the first by-product. A condenser is also connected to the second reactor for receiving and cooling the second by-product and for separating the second by-product into further by-products.

In a third embodiment, an intermediate or third reactor is positioned between the first reactor and the second reactor. The third reactor may act, as desired, as either a "second first" reactor or a "pre-second" reactor because at times it may be necessary to run the slurry through two first reactors or two second reactors. This third reactor is constructed like the other two reactors previously described.

When the third reactor is used as a second first reactor, the slurry from the first reactor passes through a flow valve to the third reactor.

Once in the third reactor, the slurry or emulsion is again hydrosaturated. As with the first reactor, the intermediate reactor heats the slurry therein and puts pressure thereon. Specifically, the temperature in the third reactor is either the same or greater than the temperature in the first reactor. In addition, the pressure in the third reactor is either less than or equal to that in the first reactor.

In addition, at times to hydrosaturate the slurry in the third, intermediate reactor additional process liquid may be introduced at the input end of this third reactor.

At the output end of the third reactor, there is means for permitting the controlled flow of vapor or steam from the third reactor and for permitting the controlled flow of the slurry, any solids, heavy oils and high boiling point materials from the third reactor to the second reactor.

The slurry moves to the second reactor for reformation. This further processing includes the reforming of the slurry and any solids by increasing the temperature and reducing or lowering the pressure placed on to the material therein.

When the third reactor is used as a pre-second reactor, as before, the slurry under pressure from the first reactor passes to the third reactor which both reduces the pressure applied to the slurry from a first pressure in the first reactor to a second, lower pressure, and heats the slurry from the first preestablished temperature in the first reactor to a second preestablished, higher temperature. The drop in the pressure combined with the increase in the temperature within the third reactor causes the slurry to reform into a first by-product comprised of solids and at least one second by-product comprised of volatile gas and liquid oils (hydrocarbons).

At the output end the intermediate reactor there is means for permitting any solids, heavy oils, and high boiling point materials which fall to the bottom of the reactor to be transported to the second reactor or to a separate solids storing facility and for permitting the vapor oil (volatile gas and liquid) to escape from the third reactor and for permitting the controlled flow of the slurry to the second reactor. This vapor oil flows to a separate storage facility or to the second reactor for further processing, which includes the further reforming of the slurry. The second reactor reforms any material not reformed in the third reactor and functions as it did in the earlier embodiment by generally increasing the temperature and reducing the pressure placed on to the slurry therein.

In a fourth embodiment, the two reactors of the second embodiment are combined into a single reactor. It is constructed again much like the other reactors previously described.

The blended process slurry is pumped into the reactor. Between the two ends of the reactor, there is a mechanism and outlet for permitting the controlled flow of vapor or steam from the reactor for further processing (purification) or storage. At the output end there is means for permitting the vapor to escape from the reactor and for permitting the solids which fall to the bottom of the reactor to continue their fall and be removed to a separate processing station or solids storing facility.

The pressure within the single reactor is controlled by the auger. The helical blade or flights attached to the shaft is variably spaced. In short, the spacing between the individual blades varies. To increase the pressure on the process slurry in the reactor, the space between turns is decreased. In the front end zone of the reactor the spacing between the blades is greater than in a portion of the back end zone of the reactor. As to the temperature, the heating means the reactor may be two or more separate heating systems. In the front end zone of the reactor, the heat is set to heat the slurry to a first temperature and in the back end zone of the reactor, the heat is set to heat the slurry to a second, higher temperature.

It is in this front end zone portion of the system that the process slurry becomes hydrated or saturated with the process liquid. The portion of the system including the back end zone reforms the material therein. The drop in the pressure combined with the increase in the temperature within the back end zone causes the slurry to reform into a first by-product comprised of solids and at least one second by-product comprised of volatile gas and liquid oils (hydrocarbons).

Other advantages and aspects of the present invention will become apparent upon reading the following description of the drawings and detailed description of the invention.

BRIEF DESCRIPTION OF DRAWINGS

The invention will be better understood from the following detailed description taken in conjunction with the figures of the drawings, wherein.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiment illustrated.

While a processor constructed in accordance with this invention may be used to process a variety of organic and inorganic materials, the following description of the first embodiment relates to specific examples wherein the material being processed (the process material) is coal and the liquid (the process liquid) mixed with the process material is water.

The First Embodiment

Figure 1:
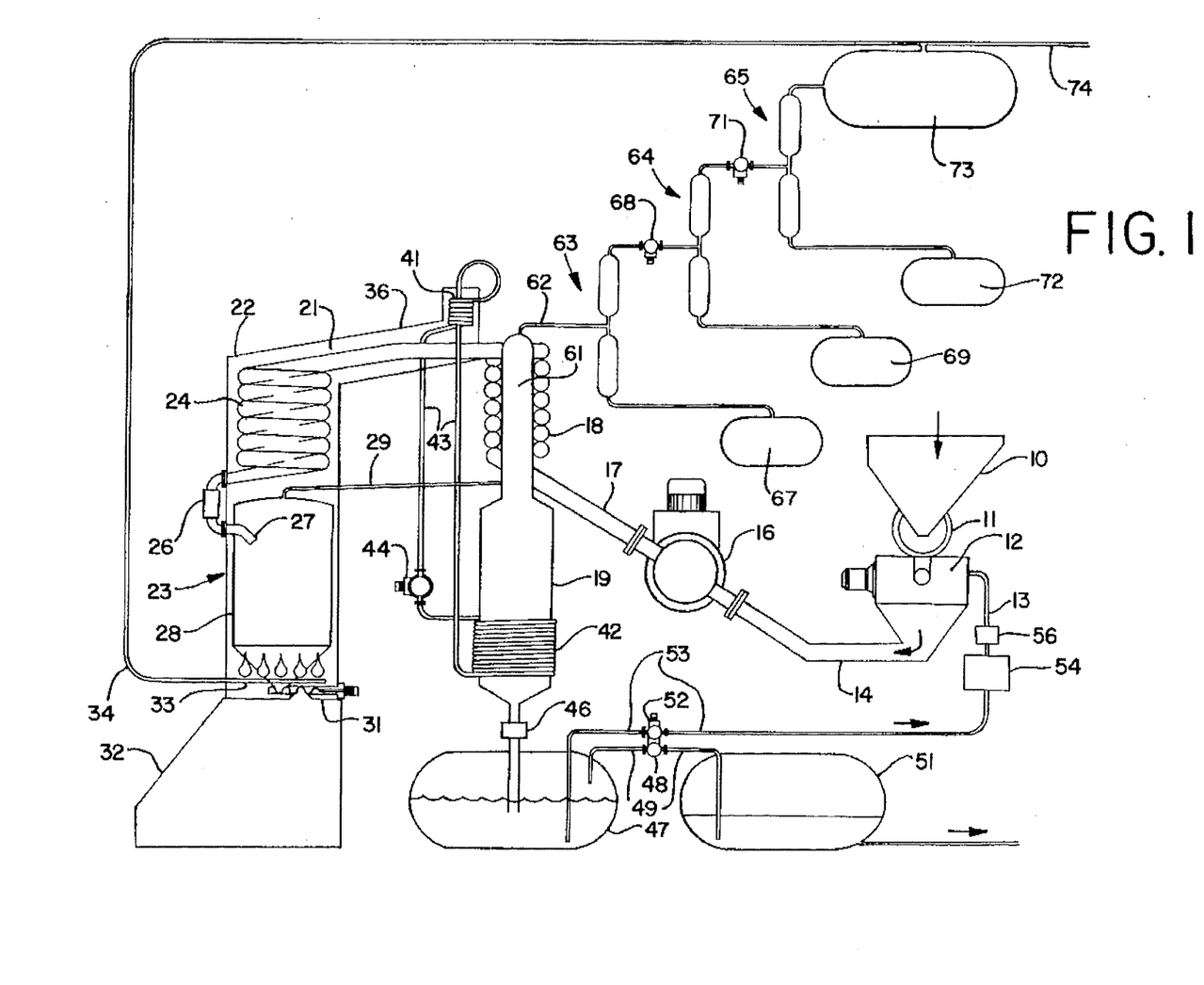
FIG. 1 is a diagram illustrating a processor constructed in accordance with a first preferred embodiment of this invention.

Turning to FIG. 1, which shows first embodiment, small pieces of process material (anthracite coal nuggets in this specific example) are loaded into a hopper 10 which feeds the coal into a grinder 11. In a continuous flow system, a steady flow of coal would go into the hopper whereas in a batch system discrete quantities of coal would be introduced. The ground up pieces of coal move to an emulsifier 12 that mixes the coal with a process liquid, such as water, and forms, in the case of water, a coal-water emulsion or suspension. The amount of water may be approximately 50 to 100% (mass to mass) of the coal. The water is fed into the emulsifier through a tube 13 which receives recycled water as will be described hereinafter. The emulsion leaves through a flow conduit or pipe 14 connected to the intake of a high pressure pump 16 that discharges the mixture through a pipe connected to the coils 18 of a heat exchanger. The coils 18 receive heat from a main condenser column 19 to be described further here inafter, and the emulsion is further heated by flowing through a pipe 21 mounted in the enclosure 22 of the heating unit 23. The pipe 21 includes a heat exchanger coil 24 mounted in the upper portion of the enclosure 22.

The portion of the processor including the outlet of the pump 16, the pipe 17, the coil 18, the pipe 21 and the coil 24 may be referred to as the low-temperature-high-pressure (LTHP) portion of the system. At the emulsifier 12, the coal and the water may be at essentially ambient pressure and temperature, whereas in the coil 24 the temperature and the pressure may be increased to approximately 250° C and 500 to 700 psi (relative pressure). The pressure in the LTHP portion is a function of the temperature and the volume of the pipe 21, and in this portion the coal becomes hydrated or saturated with water. The rate of flow of the emulsion and the length of the tube should be adjusted so that there is about a twenty minute dwell time in the high pressure part of the processor, to allow sufficient time for the reaction under high pressure. The high pressure keeps volatile components dissolved and in the solution. The operating parameters of temperature, pressure, the flow velocity and the dwell time must be balanced to produce the above dwell time and pressure and to keep the particles in suspension.

The outlet of the coil 24 is connected to a valve 26 that acts as a differential pressure regulator. The outlet 27 of the valve 26 opens into an expansion container 28 wherein the pressure is reduced almost instantly to between approximately 0 and 200 psi (relative pressure). The incoming material is also quickly heated to approximately 350° to 500° C. A portion of the system including the container 28 may be referred to as the high-temperature-low-pressure (HTLP) portion of the processor. The sudden drop in the pressure combined with the sharp increase in temperature causes the slurry or emulsion (again, the terms emulsion and slurry being used interchangeably to describe the material being worked upon in the process) to separate into solids and volatile gas. The gas leaves the container through an outlet pipe 29 connected to the upper end of the container 28 and the solids fall to the bottom of the container 28 where they are removed by, for example, an auger 31. In the case where coal is fed into the processor, coke is removed and temporarily stored in a lower bin 32.

The container 28 of the HTLP portion is heated by a gas burner 33 mounted around the bottom of the container 28 within the enclosure 22. A tube 34 receives a gas product of the processor and feeds it to the burner 33. The container 28 and the burner 33 are mounted in the enclosure 22 along with the coil 24 and the pipe 21, and consequently the burning gas heats these components. The burner exhaust is discharged through a chimney portion 36 of the enclosure 22, the pipe 21 extending through the chimney portion to make maximum utilization of the heat.

The gas in the outlet pipe 29 is fed to the interior of the previously mentioned main condenser column 19 where the pressure and the temperature are regulated to cause water and oil to condense and separate from the volatile components which remain in a gaseous state. Regulation is accomplished by a heat exchanger including a first coil 41 mounted within the chimney portion 36 of the enclosure 22, and a second coil 42 which encircles the condense column 19. Pipes 43 connect the two coils 41 and 42 and a regulator pump 44 circulates a heat exchange fluid (such as oil) through the coils to transfer heat from the chimney portion 36 to the column 19 as needed.

The oil and the water move downwardly through a trap 46 to a reservoir 47 where they naturally separate due to their different weights. A first pump 48 and tubes 49 remove the oil to a storage tank 51. A second pump 52 and tubes 53 remove the water and pass it through a sulfur removal unit 54 and a control valve 56 to the emulsifier 12, thereby recycling the water.

The relatively hot volatile gas moves upwardly through an upper portion 61 of the main or primary condenser column 19, the heat exchanger coil 18 extending around the upper portion 61 so that the slurry in the LTHP part of the system is heated by the gas leaving the column 19. Connected to the upper end of the main condenser column 19 is a pipe 62 which feeds the hot volatile gas to a series of secondary condenser columns 63, 64 and 65. The gas gradually decreases in temperature and increases in pressure as it moves through the secondary columns, and the pressure and temperature determine the condensate drawn off in each condenser stage. In this specific example, the gas is at about atmospheric pressure and 180° C. entering the first stage 63 and kerosine is produced and drawn off to a tank 67. A condenser pump 68 connects the two stages 63 and 64 and gas enters the stage 64 at about atmospheric pressure and 110° C. and toluene is drawn off and fed to a tank 69. Another pump 71 connects the stages 64 and 65 and the gas enters the stage 65 at atmospheric pressure and 30° C., and gasoline is drawn off to a tank 72.

Any remaining gas is fed to a storage tank 73 from the last condenser stage 65, and the previously mentioned tube or pipe 34 is connected to receive gas from the tank 73 for operating the burner 33. Another tube 74 is connected to the tube 34 and the storage tank 73 and is connected to receive a combustible gas from a commercial source (not illustrated). By this arrangement, the processor may be started in operation utilizing gas from the commercial source. Once the processor is running and producing gas, the tube 74 to the commercial source may be turned off and the burner 33 operated by gas produced by the processor. Of course, if the processor produces more gas than can be utilized to power the processor, the surplus gas may be drawn off and sold commercially.

Thus, the system receives coal and, without producing pollution, converts the coal into a number of valuable products. The coke in the bin 32 is a valuable source of low pollution heat; the quality and purity of the coke is a function of the temperature in the heating unit 23, the purest coke being produced at the high temperature of about 500° C. The sulfur removed by the unit 54 may also have commercial value, and the oil in the container 51 may find use as, for example, heating oil.

After the HTLP unit the coal slurry is chemically reformed and no longer has the physical attributes of the original coal. The pressure in the HTLP unit or container 28 determines the type of liquid-gas products produced in the main and secondary condenser columns. For example, a low pressure (about 0 psi relative) produces light oils rich in aromatic hydrocarbons; higher pressures (about 200 psi relative) produces heavier oils richer in asphaltenes. Because volatilization is the result of heat gain in the unit 23, the majority of the heat is contained in the volatile gas which flows to the main condenser coil, and part of the heat is given up to the coil 18 to heat the incoming coal slurry. The rate at which the gas travels up the main condenser column 19 is determined by the pressure in the container 28 which in turn can be adjusted by the operator using the pump-valve 26. The pressures in the secondary condenser stages 68, 64 and 65 may be controlled by the operator using the pumps 68 and 71. Higher pressure results in lower temperature required to liquefy the volatile gas components, thus requiring less energy for cooling needed in the liquification process.

While the foregoing specific example relates to the reformation of coal, any other organic or inorganic material may be used, which can be chemically reformed into other products by varying the temperature and the pressure.

As another example, instead of coal, soybeans may be used, and a lower pressure of less than about 100 psi (relative pressure) in the LTHP unit would be necessary because soybeans tend to absorb water until they are saturated. In the HTLP unit, the pressure can be adjusted to about 0 to 200 psi (relative) in order to control the molecular weight of the oil desired to be produced. The remainder of the system would be essentially as described previously with respect to coal.

When processing coal, the process liquid may be plain water or a solution of water plus calcium carbonate, sodium or calcium hydroxide. For organic material other than coal, one may use acid hydrolysis utilizing carbonic acid plus water, including any other appropriate catalyst. The processor may also be used to convert HDPE plastic to oil or a 50% mass to mass mixture of plastic and coal may be run to produce coke and oil. This produces an increase in oil of five barrels per ton of coal processed.

While a gas heater has been disclosed for heating the process materials, it will be apparent that other heat sources may be utilized, such as for example heater wires. The valves, pumps, etc. may be operated by hand or by a computerized automatic control.

The Second Embodiment

Figure 2:
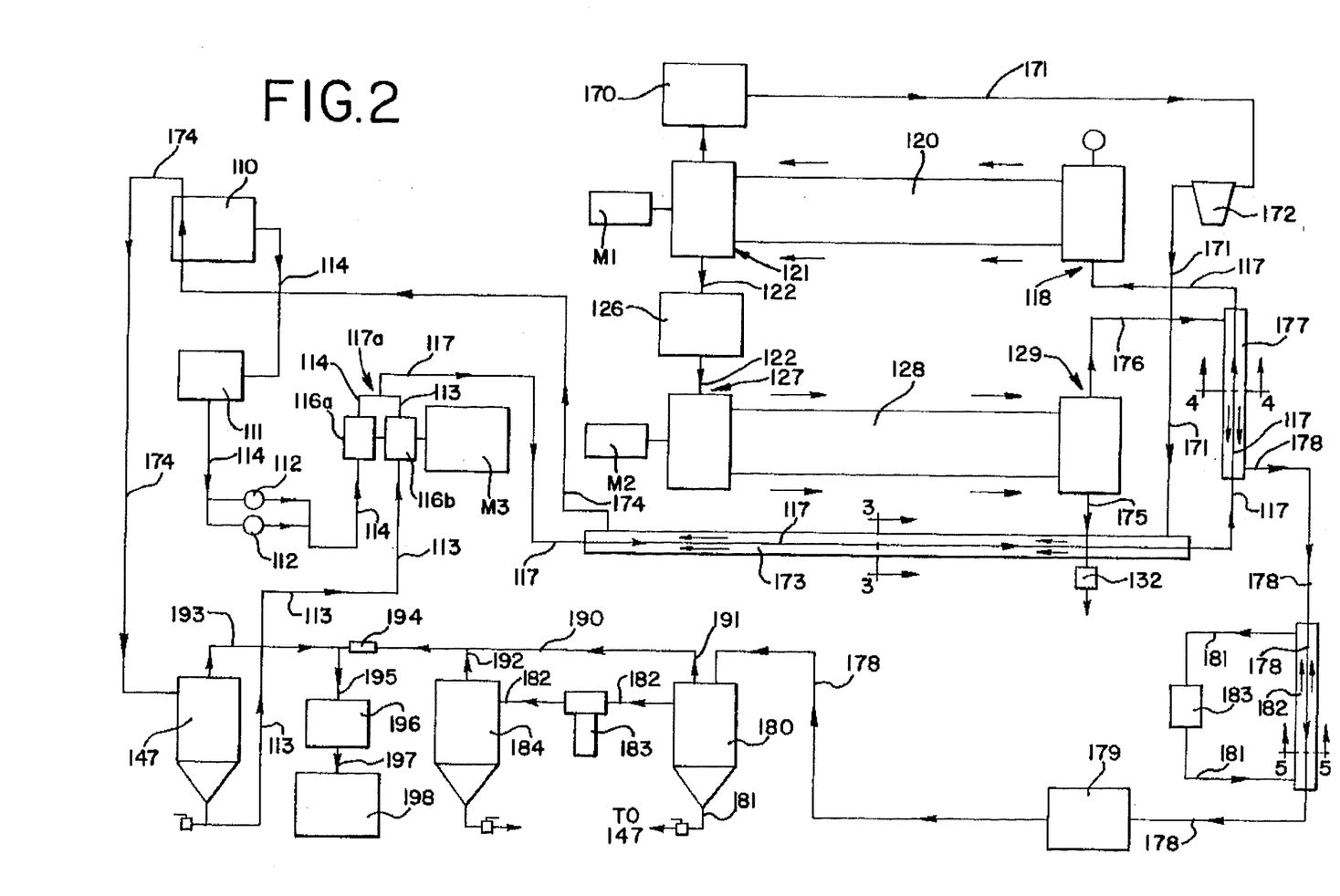
FIG. 2 is a diagram illustrating a processor constructed in accordance with a second preferred embodiment of the present invention.

Turning to FIG. 2, which shows a second embodiment, a hopper 110 is provided for receiving the process material. The process material may be any inorganic or organic substance. A material input conduit 114 is connected to the hopper 110 for receiving and transporting the process material to a first material pump 116a. As with the first embodiment, a grinder 111 may be employed to chop, pulverize or grind large pieces of material. Additionally, conventional strainers 112 may be put into or adjacent the hopper 110 to prevent large pieces of material from entering the system's conduits. To further process the material, a conventional mixing chamber (not shown) having a vessel and internal mixing blade or mixing joint (not shown) may be employed in the line after the grinder 111 and strainers 112. The process material within this material input conduit 114 is driven by either gravity or a pump (not shown).

A separate liquid storage reservoir or tank 147 holds a process liquid. The preferable process liquid is water. However, the process liquid can be any organic solvent. Examples include alcohol, toluene, methylene chloride, and hexene. This process liquid flows through a liquid input conduit 113 to a first liquid pump 116b by means of either gravity or a separate pump (not shown).

The process material is pumped by the first material pump 116a to a first slurry conduit 117. Similarly, the process liquid is pumped by the first liquid pump 116b to the first slurry conduit 117. Both pumps are driven by a motor M3. As shown in FIG. 2, a mixing joint 117a is disposed between the two pumps 116 and the first slurry conduit 117. In particular, the mixing joint 117a is Y-shaped or T-shaped having two input openings, one input opening being connected to the material input conduit 114 and the other input opening being connected to the liquid input conduit 113. The one output opening is connected to the first slurry conduit 117. As a result of this arrangement, the process liquid and the process material are mixed or emulsified to form or create a flowable liquid-material slurry or emulsion and are put under pressure by the pumps (the terms emulsion and slurry being used interchangeably to describe the material being worked upon in the process or processor). It is appreciated that this arrangement can be modified so that only one pump, instead of two pumps 116a,116b, may be employed and that the mixing of the material and liquid may be done prior to their entering the pumps. In addition, while not shown, a conventional mixing chamber having a vessel and internal mixing blade may be used in place of a mixing joint.

Once the slurry passes the pumps 116a,116b, the slurry is under pressure. This pressure may be preestablished and is controlled by the interaction between the pumps 116a,116b, and two output valves 170,126 and the temperature of the slurry between the pumps and valves.

Figure 3:
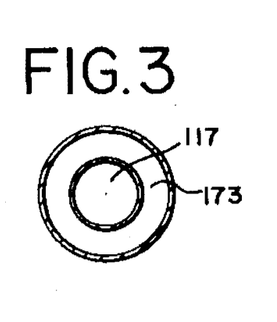
FIG. 3 is a schematic cross-sectional view taken along line 3—3 in FIG. 2.

To assist in either heating or cooling the materials, emulsions, slurries, liquids and gases flowing through the system, various heat transfer techniques are employed. For example, in the system shown in FIG. 2, three heat exchangers are incorporated. (Shown schematically in FIGS. 3, 4 and 5). The process material flowing through the first slurry conduit 117 is preheated by a liquid, in the form of steam or vapor oil travelling in an opposite direction in a concentric exterior pipe 173 (the second branch of the steam conduit). This counterflow heat transfer or exchange technique is shown in FIG. 3.

Figure 4:
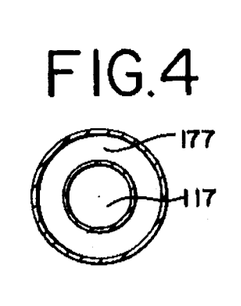
FIG. 4 is a schematic cross-sectional view taken along line 4—4 in FIG. 2.

The slurry is further preheated by a liquid in the form of a warmer hot oil product or vapor oil travelling in an opposite direction in a concentric exterior pipe 177 (the second branch of the output conduit). This counterflow heat exchanger is shown in FIG. 4. Accordingly, the two heat exchangers are in series along the first slurry conduit 117.

The slurry, under pressure, moves within the first slurry conduit 117 into a first reactor 120. This first reactor 120 receives the slurry and both heats it to a first preestablished temperature and applies a first pressure to it. It should be noted that at times the first reactor will heat the slurry to a temperature above the temperature the slurry obtained in the first slurry conduit; at other times, the first reactor will heat the slurry to the same temperature the slurry obtained in the first slurry conduit.

Figure 6:
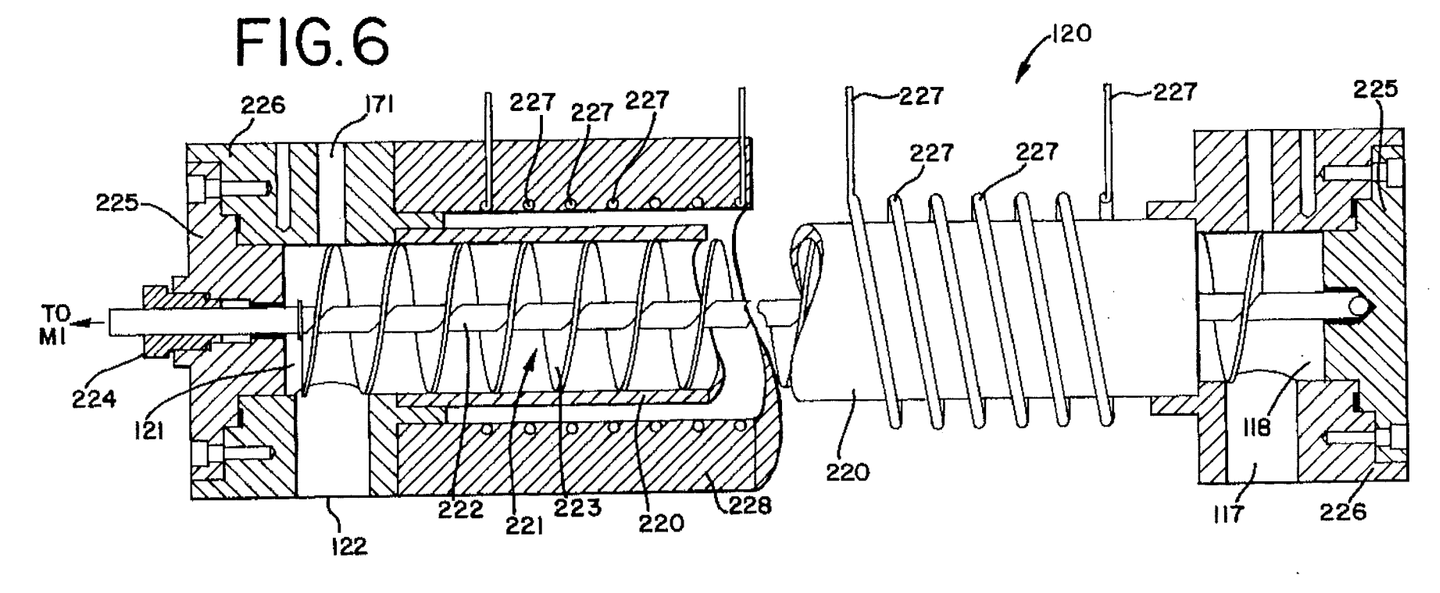
FIG. 6 is a sectional view of the first reactor of FIG. 2.

The first reactor 120, shown in detail in FIG. 6, is a cylindrical shell 220 having an input end 118 and an output end 121 and internal means for moving the slurry from the input end to the output end. The means for moving the slurry is an internal screw or auger 221. This auger has a central shaft 222 with an attached helical blade 223. The shaft 222 is supported within the first cylindrical reactor by an end bracket 224 supported in end pieces 225 and end blocks 226 bolted together. The screw or auger is driven by an external motor M1 attached to one end of the auger.

External heating means, such as helical heater wires 227 are wrapped around the cylindrical shell 220 of the first reactor 120 to heat the contents. A layer of insulation 228 is placed around the heater wires 227 and the shell 220 to reduce heat loss within the reactor and to prevent injury or damage to people and items located external the reactor 120. In lieu of the heater wires, other heating elements or sources may be employed, such as heated gas or steam elements or burners.

While an internal auger is shown, a tube heat exchanger and a burner, like heat exchanger coil 24 and burner 33 of the first embodiment (FIG. 1), may be employed.

At the output end 121, in an upper position, of the first reactor 120, there is an opening and an escape valve 170 for permitting the controlled flow of steam or vapor from the first reactor. This steam or vapor, generally comprised of both water and contaminants (if water is used) or vapor oil (volatile gas, process liquid and liquid), flows through the escape valve 170 and into a first branch of a steam conduit 171. It is, of course, appreciated that the escape valve can be spaced from the first reactor and disposed within the first branch of the steam conduit, which, in turn, is connected to the first reactor.

A separator 172, such as a cyclone separator, is positioned along and within this steam conduit's first branch 171. This separator 172 separates the heavy material and contaminants from the steam or vapor. In the alternative, a water treatment system or similar apparatus may be inserted in the steam conduit 171. Consequently, a purer form of steam or vapor passes onward within the first branch of the steam conduit 171 to a connected second branch of the steam conduit 173. As shown in FIG. 3, the second branch of the steam conduit 173 is concentric with and parallel to first slurry conduit 117. The flow within these concentric conduits 117,173 is counter. As a result, and seen in FIG. 2, the slurry flowing from left to right in the first slurry conduit 117 is warmed by the steam or vapor flowing from right to left in the external second branch of the steam conduit 173. At the same time, the steam or vapor is cooled by the counterflowing cooler slurry.

The steam/vapor flows from the second branch 173 into and through a third branch of the steam conduit 174 and into the separate liquid storage reservoir or tank 147 which holds the process liquid. The third branch 174 is designed to pass through the hopper 110 in order to warm or preheat the process material.

With this design, the process liquid is recycled through the system.

A second flow valve 126 is also at the output end 121 of the first reactor 120 for permitting the controlled flow of the slurry or emulsion from the first reactor to the second reactor 128. This second flow valve 126 is preferably synchronized with the first flow valve, the escape valve 170. The two valves 126,170 open and close together or they may be controlled independently.

A second slurry conduit 122 connects the two reactors 120,128 with the second flow valve 126 disposed therein controlling the flow therebetween. The second flow valve 126 acts as a differential pressure regulator.

This portion of the processor including the pumps 116, the first slurry conduit 117, the first reactor 120 the second slurry conduit 122 and the flow valve 126 may be referred to as the low-temperature-high-pressure (LTHP) portion of the system. As with the first embodiment, the pressure in the LTHP portion of the system is a function of the temperature and the volume of the first reactor 120. It is in this LTHP portion of the system that the process material becomes hydrated or saturated with the process liquid.

The rate of flow of the slurry or emulsion may also be controlled by either the length of the first reactor or by the motor speed of the motor M1 for the auger. The rate of flow must be adequate to allow sufficient dwell time for the hydrolysis reaction under the pressure. Again, as with the first embodiment, the high pressure of the LTHP portion keeps volatile components, such as hydrocarbons, dissolved in the solution of organic material. The operating parameters of temperature, pressure, flow velocity and dwell time must be balanced to produce and permit proper saturation or hydration.

The slurry, under pressure, quickly moves within the second slurry conduit 122 into the second reactor 128. This second reactor 128 receives the slurry and both reduces the pressure applied to the slurry from the first pressure of the first reactor to a second, lower pressure, and heats the slurry from the first preestablished temperature of the first reactor to a second preestablished temperature. This portion of the system including the second reactor 128 may be referred to as the high-temperature-low pressure (HTLP) portion of the processor. The sudden drop in the pressure combined with the sharp increase in the temperature within the second reactor causes the slurry to reform into a first by-product comprised of solids and at least one second by-product comprised of volatile gas and liquid oils (hydrocarbons).

Because the slurry which is hot and under pressure in the first reactor, moves to the second reactor, which is hotter but at a lower pressure, the slurry undergoes an explosive expansion upon the opening of the second flow valve.

The second reactor 128 is constructed like the first reactor 120. This second reactor is a cylindrical shell having an input end 127 and an output end 129 and internal means for moving the slurry from the input end to the output end. The means for moving the slurry is preferably also an internal screw or auger. The screw or auger is driven by an external motor M2 attached to one end of the auger.

As with the first reactor, external heating means, such as helical heater wires are wrapped around the cylindrical shell of the second reactor 128 to heat the contents. A layer of insulation is placed over the heater wires to reduce heat loss within the reactor and to prevent injury or damage to people and items located external the reactor.

The rate of flow of the slurry or emulsion may be controlled by either the length of the second reactor or by the motor speed of the motor M2 for the auger. The rate of flow must be adequate to allow sufficient dwell time for the reaction or reformation. The operating parameters of temperature, pressure, flow velocity and dwell time must be balanced to produce and permit this reaction or reformation.

At the output end 129, in the bottom of the reactor there is an opening and bottom pipe 175 for permitting the solids which fall to the bottom of the reactor 128 to continue their fall and be removed to a separate solids storing facility 132. In addition, at the output end 129, in an upper position, of the second reactor 128, there is an opening and an outlet conduit 176 for permitting the vapor oil (volatile gas and liquid) to escape from the second reactor. This vapor oil flows through the first branch of the outlet conduit 176 into a second branch of the outlet conduit 177.

As shown in FIG. 4, the second output branch 177 is concentric with and parallel to the first slurry conduit 117. The flow within these concentric conduits 177,117 is counter. As a result, and seen in FIG. 2, the slurry flowing schematically upward in the first slurry conduit is warmed by the vapor oil flowing schematically downward in the second branch of the output conduit. At the same time, the vapor oil is cooled by the counterflowing cooler slurry.

This vapor oil flows from the second branch of the output conduit 177 into a third branch of the output conduit 178. An output valve 179 is disposed within this third branch 178. Accordingly, the pressure will be the same in the system between the second flow valve 126 and the output valve 179. While the vapor oil is in the second and third branches 177,178 of the output conduit, the pressure and temperature are regulated to cause the process liquid, such as water, and oil to condense and separate from the volatile components which remain in a gaseous state.

The volatile gas can be, if desired, burned or further condensed or separated as shown in the first embodiment of the present invention.

Figure 5:
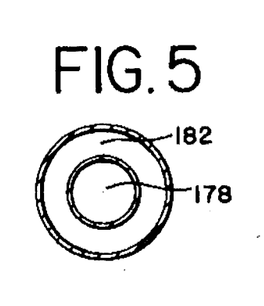
FIG. 5 is a schematic cross-sectional view taken along line 5—5 in FIG. 2.

The process liquid and oil travelling in the output conduit's third branch 178 passes through a third heat exchanger. For example, a separate coolant, such as water or glycol, can be stored in a coolant chamber 183 and transported through coolant pipes 181,182 adjacent to or concentric and counter to the vapor oil in the third branch of the output conduit 178. A counterflow schematic is shown in FIG. 5.

The process liquid and oil in the third branch of the output conduit 178 continue into a gravity separator wherein the oil and process liquid is separated by conventional means. The process liquid passes through a lower opening in the separator 180 and into a return pipe 181 which is connected to the liquid reservoir 147 and recycled through the system. The oil passes through a separate opening in the separator 180, into an oil pipe 182 with an oil filter 183 disposed therein, and to a storage oil tank 184.

A venting system is provided to remove all vapors. This venting system comprises a primary vent pipe 190 that is connected to and fed by a liquid reservoir vent pipe 193, an oil tank vent pipe 192, and a separator vent pipe 191. An in-line one way valve 194 prevents the reverse flow of the vapors and the contamination of the tanks. The primary vent pipe 190 feeds into a second branch pipe 195 which is connected to an accumulator 196, connection pipe 197 and storage tank 198.

The system just described may be fully automated. The temperatures, pressures, dwell times and valves may be manually controlled from a control panel or automatically controlled by a computer.

This process may also be used with inorganic process materials. For example, if the process material is ferrous oxide (Fe2O3) and the process liquid is water, one can use the above described system to produce steam (H2O and O2) and molten pure iron. Steam would have to be drawn from both reactors.

To desulfrize coal one can use coal as the process material. Three reactors are employed instead of two reactors. There would be two first reactors for saturating the coal, the first using water as the process liquid and the second, in series with the first reactor, using an oxidizing agent, such as Hydrogen Peroxide (1–3%).

It should be apparent from the foregoing that novel and improved processors, which may be referred to as thermal depolymerization processors (TDP), have been provided. The processor may be operated to convert a variety of materials into useful and valuable products. For example, products such as garbage, leaves and grass which otherwise would create environmental problems may be converted to useful products, thereby avoiding the need for landfills and incinerators. The processors may be built in various sizes such as a small unit for a single family home to a large unit for use by a municipality or a large hospital.

The following are specific examples using the second embodiment of the present invention:

First Example
- Type of process material placed into hopper 110: most organics Temperature of material in hopper 110: 30°–150° C.
- Temperature of material in material input conduit 114 between hopper 110 and first material pump 116a: 150° C. Pressure of material in material input conduit 114 between hopper 110 and first material pump 116a: 0 psi (ATM)
- Temperature of water in tank 147: 30°–90° C. Pressure of water in tank 147: 0 psi
- Temperature of slurry in first slurry conduit 117 between pump 116 and first reactor 120: 150°–250° C. Pressure of slurry in first slurry conduit 117 between pump 116 and first reactor 120: 150–600 psi
- Temperature of slurry between input 118 and output 121 of first reactor 120 (valve 126): 150°–250° C. Pressure of slurry between input 118 and output 121 of first reactor 120 (valve 126): 150–600 psi Time of slurry travelling between input 118 and output 121 of first reactor 120 (valve 126): 10–15 min.
- Temperature of slurry between input 127 in short (valve 126) and output 129 of second reactor 128: 300°–500° C. Pressure of slurry between input 127 (valve 126) and output 129 of second reactor 128: 0–200 psi Time of slurry travelling between input 127 (valve 126) and output 129 of second reactor 128: 10–15 min.
- Temperature of vapor oil in third branch of output conduit 178 after valve 179: 30° C. Pressure of vapor oil in third branch of output conduit 178 after valve 179: 0 psi –20 inches Hg
- Type of solid produced by process: carbon (pure)
- Type of liquid produced by process: very light viscosity crude oil (5–30 carbons) (high grade cracking stock)/ (#3–#4 diesel fuel)

Type of gas produced by process: a mixture having 1–5 carbon (methane-pentane)

Second Example
- Type of process material placed into hopper 110: Triglyceride (fat) Temperature of material in hopper 110: 150° C.
- Temperature of material in material input conduit 114 between hopper 110 and first material pump 116a: 150° C. Pressure of material in material input conduit 114 between hopper 110 and first material pump 116a: 0 psi (ATM)
- Temperature of water in tank 147: 30° –90° C. Pressure of water in tank 147: 0 psi
- Temperature of slurry in first slurry conduit 117 between pump 116 and first reactor 120: at least 150° C. Pressure of slurry in first slurry conduit 117 between pump 116 and first reactor 120: 200 psi
- Temperature of slurry between input 118 and output 121 of first reactor 120 (valve 126): 200° C. Pressure of slurry between input 118 and output 121 of first reactor 120 (valve 126): 200 psi Time of slurry travelling between input 118 and output 121 of first reactor 120 (valve 126): 15 min.
- Temperature of slurry between input 127 (valve 126) and output 129 of second reactor 128: 400° C. Pressure of slurry between input 127 (valve 126) and output 129 of second reactor 128: 100 psi Time of slurry travelling between input 127 (valve 126) and output 129 of second reactor 128: 15 min.
- Temperature of oil product in third branch of output conduit 178 after valve 179: 30° C.
- Pressure of vapor product in third branch of output conduit 178 after valve 179: 0 psi
- Type of solid produced by process: coke
- Type of liquid produced by process: very light viscosity crude oil (5–30 carbons) (high grade cracking stock)/ (#3–#4 diesel fuel)
- Type of gas produced by process: a mixture having 1–5 carbon (methane-pentane)

Third and Fourth Examples
- Type of process material placed into hopper 110: coal or Poly-Chlorinate-Biphenyl (PCB) Temperature of material in hopper 110: 30° C.
- Temperature of material in material input conduit 114 between hopper 110 and first material pump 116a: 30°–150° C. Pressure of material in material input conduit 114 between hopper 110 and first material pump 116a: 0 psi (ATM)
- Temperature of water in tank 147: 30° C. Pressure of water in tank 147: 0 psi Temperature of slurry in first slurry conduit 117 between pump 116 and first reactor 120: 200° C. Pressure of slurry in first slurry conduit 117 between pump 116 and first reactor 120: 600 psi

- Temperature of slurry between input 118 and output 121 of first reactor 120 (valve 126): 250° C. Pressure of slurry between input 118 and output 121 of first reactor 120 (valve 126): 600 psi Time of slurry travelling between input 118 and output 121 of first reactor 120 (valve 126): 15 min.
- Temperature of slurry between input 127 (valve 126) and output 129 of second reactor 128: 500° C. Pressure of slurry between input 127 (valve 126) and output 129 of second reactor 128: 100 psi Time of slurry travelling between input 127 (valve 126) and output 129 of second reactor 128: 15 min.
- Temperature of oil product in third branch of output conduit 178 after valve 179: 30° C. Pressure of vapor oil in third branch of output conduit 178 after valve 179: 0 psi Type of solid produced by process: carbon (pure) Type of liquid produced by process: very light viscosity crude oil (5–30 carbons) (high grade cracking stock)/ (#3–#4 diesel fuel Type of gas produced by process: a mixture having 1–5 carbon (methane-pentane)

The Third Embodiment

Figure 7:
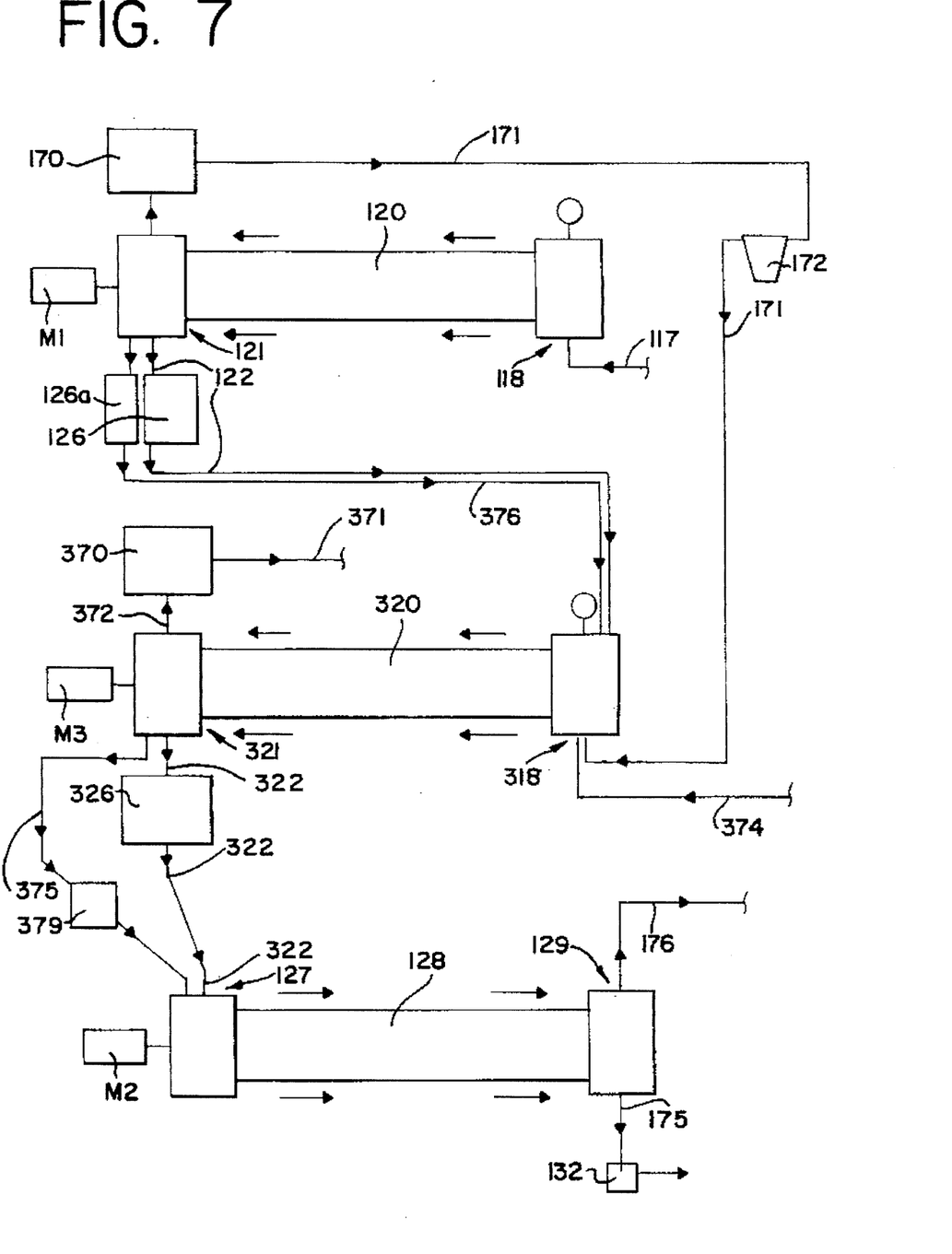
FIG. 7 is a diagram illustrating a portion of a processor constructed in accordance with a third preferred embodiment of the present invention; and, FIG. 8 is a schematic diagram illustrating a portion of a processor constructed in accordance with a fourth preferred embodiment of the present invention and includes a graph of heat or temperature of the process slurry v. distance travelled in the reactor and a graph of the pressure applied to the process slurry v. distance travelled in the reactor.

FIG. 7 shows a third embodiment, which is similar to the second embodiment except for the introduction of an intermediate, third reactor 320 disposed between the first reactor 120 and the second reactor 128. For clarity, similar reference numbers are used for similar components and most of the same hardware of the system is not shown. In this third embodiment, the third reactor 320 may act as a "second first" reactor (120) or a "pre-second" reactor (128). Specifically, at times it may be necessary to run the slurry or emulsion through two first reactors or two second reactors.

This third reactor 320 is constructed like the other two reactors 120,128 previously described in connection with FIGS. 2–6. It includes a cylindrical shell 220 having an input end 318 and an output end 321 and internal means for moving the slurry from the input end to the output end. The means for moving the slurry, like before, is an internal screw or auger 221. This auger has a central shaft 222 with an attached helical blade 223. The shaft 222 is supported within the third reactor by an end bracket 224 supported in end pieces 225 and end blocks 226 bolted together. The screw or auger is driven by an external motor M3 attached to one end of the auger.

External heating means, such as helical heater wires 227 or gas tubes are wrapped around the cylindrical shell 220 of the third reactor 320 to heat the contents. A layer of insulation 228 is placed around the heater wires 227 and the shell 220 to reduce heat loss within the reactor and to prevent injury or damage to people and items located external the reactor 320.

When the third reactor 320 is used as a second first reactor (120), the slurry from the first reactor 120 passes to the second flow valve 126 at the output end 121 of the first reactor 120, which permits the controlled flow of the slurry from the first reactor to the third reactor 320. As to solid material, heavy material or material having an extremely high boiling point existing after the end of the processing through the first reactor 120, it passed through a control valve 126a and through a solids, bottom conduit 376 directly to the input end of the third reactor. The second flow valve 126 is synchronized with the first flow valve (116), control valve 126a and the escape valve 170. The three valves 126,126a,170 open and close together or they may be controlled independently.

The second slurry conduit 122 connects the two reactors 120,320 with the second flow valve 126 disposed therein controlling the flow therebetween. The second flow valve 126 may, if desired, also acts as a differential pressure regulator.

As to the resultant vapor (generally comprised of both water and contaminants or process liquid used in the first reactor and contaminants (oil vapor)), it passes through the escape valve 170 into a steam conduit 171. A separator and purifier 172 (or treatment system) may be positioned along and within this steam conduit 171 to clean the material passing therethrough. Thus, a purer form of vapor or steam passes onward within the steam conduit 171 onward to the connected second branch of the steam conduit 173, (FIG. 2), through a third branch of the steam conduit (174) and into the separate liquid storage reservoir or tank (147) which holds the process liquid or through to the third reactor 320.

Once in the third reactor 320, the slurry (including any solids) is again hydrosaturated, part of the low-temperature-high-pressure (LTHP) portion of the system. The pressure in the LTHP portion of this system is again a function of the temperature and the volume of the two reactors 120,320. It is in this LTHP portion of the system that the process slurry becomes hydrated or saturated with the process liquid. As with the first reactor 120, the intermediate reactor 320 heats the slurry therein and puts pressure thereon. Specifically, the temperature in the third reactor 320 is either the same or greater than the temperature in the first reactor 120. In addition, the pressure in the third reactor is either less than or equal to that in the first reactor.

In addition, at times to hydrosaturate the slurry in the third, intermediate reactor 320, additional process liquid may be introduced at the input end 318 of the reactor 320. This additional process liquid may be vapor from the steam conduit 171 or other materials introduced through a separate input conduit 374, such as plain water, a solution of water plus calcium carbonate, sodium or calcium hydroxide, or acid hydrolysis utilizing carbonic acid plus water, including any other appropriate catalyst or organic solvent.

As with the prior embodiment, the rate of flow of the slurry or emulsion in the reactors may be controlled by either the length of the reactors or by the motor speed of the motors M1,M3 for the augers. Again, the rates of flow must be adequate to allow sufficient dwell time for the hydrolysis reaction under the pressure selected. The high pressure of the LTHP portion keeps volatile components, such as hydrocarbons, dissolved in the solution of organic material. The operating parameters of temperature, pressure, flow velocity and dwell time are balanced to produce and permit proper saturation or hydration.

At the output end 321, in an upper position, of the third reactor 320, there is an opening, conduit 372 and an escape valve 370 for permitting the controlled escape of vapor from the third reactor. This vapor, generally comprised of both water and contaminants (if water is used) or vapor oil (volatile gas, process liquid and liquid)(if a process liquid other than water is used) and contaminants, flows through the escape valve 370 and into a steam conduit 371. A separator and purifier (not shown) (or treatment system) may be positioned along and within this steam conduit 371 to clean the material passing therethrough. Thus, a purer form of vapor passes onward within the steam conduit 371 onward to either, if a similar process liquid is used in conjunction with the third reactor, the connected second branch of the steam conduit 173, (FIG. 2), through a third branch of the steam conduit (174) and into the liquid storage reservoir or tank (147) which holds the process liquid for the first and third reactor, or, if a different process liquid is used in conjunction with the third reactor than that of the first reactor, a separate and distinct connected second branch of the steam conduit (not shown) and into a separate and distinct liquid storage reservoir or tank which holds the different process liquid.

A third flow valve 326 is also at the output end 321 of the third reactor 320 for permitting the controlled flow of the slurry from the third reactor to the second reactor 128. This second flow valve 326 is preferably synchronized with the second flow valve 126, control valve 379 and the escape valve 370. The three valves 326,379,370 open and close together or they may be controlled independently.

Generally, processed liquid and process liquid will pass through the second flow valve 326 and vapor (oil mixture) will pass through the escape valve 370. Solids and heavy oils and other material having a high boiling point which fall to the bottom of the reactor 320 will pass through the lower control valve 379 and bottom pipe 375 to the input end of the second reactor 128. to the second reactor 128.

The intermediate slurry conduit 322 connects the two reactors 320,128 with the third flow valve 326 disposed therein controlling the flow therebetween. It is this third flow valve 326 that acts as a differential pressure regulator.

The slurry moving through the third flow valve 326 and the slurry conduit 322 and the solids moving through the control valve 379 and bottom pipe 375 pass to the second reactor 128 for reformation. This further processing includes the reforming of the slurry and solids by increasing the temperature and reducing or lowering the pressure placed on to the material therein.

Specifically, once in the second reactor 128, the pressure applied to the slurry is equal to or less than the pressure applied in the third reactor 320. The heat applied to the slurry in the second reactor 128 heats the slurry to a temperature greater than or the same as that obtained in the third reactor 320.

When the third reactor 320 is used as a pre-second reactor (128), as before, the slurry from the first reactor 120 passes to the second flow valve 126 at the output end 121 of the first reactor 120, which permits the controlled flow of the slurry from the first reactor to the third reactor 320.

The slurry, under pressure, quickly moves within the second slurry conduit 122 into the third reactor 320. This third reactor 320 receives the slurry and both reduces the pressure applied to the slurry from a first pressure in the first reactor to a second, lower pressure, and heats the slurry from the first preestablished temperature in the first reactor to a second preestablished, higher temperature. This portion of the system including the third reactor 320 (as a pre-second reactor 128) and the second reactor 128 act together in this case as the high-temperature-low pressure (HTLP) portion of the processor. The sudden drop in the pressure combined with the sharp increase in the temperature within the third reactor causes the slurry to reform into a first by-product comprised of solids and at least one second by-product comprised of volatile gas and liquid oils (hydrocarbons).

The rate of flow of the slurry or emulsion may again be controlled by either the length of the third reactor or by the motor speed of the motor M3 for the auger. The rate of flow must be adequate to allow sufficient dwell time for the reaction or reformation. The operating parameters of temperature, pressure, flow velocity and dwell time must be balanced to produce and permit this reaction or reformation.

At the output end 321, in the bottom of the reactor there is an opening, control valve 379 and bottom pipe 375 for permitting any solids, heavy oils and other material having a high boiling point which fall to the bottom of the reactor 320 to continue their fall and be transported to the input end of the second reactor 128.

The third flow valve 326 is also at the output end 321 of the third reactor 320 for permitting the controlled flow of the slurry from the third reactor to the second reactor 128. This second flow valve 326 is preferably synchronized with the second flow valve 126, control valve 379 and the escape valve 370. The three valves 326,379,370 open and close together or they may be controlled independently.

This further processing includes the further reforming of the slurry. The second reactor reforms any material not reformed in the third reactor. It, in short, ensures complete reformation by increasing the temperature and reducing or lowering the pressure placed on to the slurry therein.

Specifically, once in the second reactor 128, the pressure applied to the slurry is equal to or less than the pressure applied in the third reactor 320. The heat applied to the slurry in the second reactor 128 heats the slurry to a temperature greater than or the same as that obtained in the third reactor 320.

In this third embodiment, the material being processed in the form of slurries and emulsions and solids, moves through the three reactors, first, intermediate and second. With each reactor, the slurry or emulsion is further heated and the pressure is reduced. In some instances the process liquid in the first reactor and the intermediate reactor may be different. In addition, if certain specific outcomes or by-products are desired, it may be necessary to have the intermediate reactor or second, end reactor to increase the pressure on the slurry passing therethrough relative to the preceding reactor or decrease the heat and resultant temperature of the slurry passing therethrough relative to the preceding reactor.

The Fourth Embodiment

Figure 8:
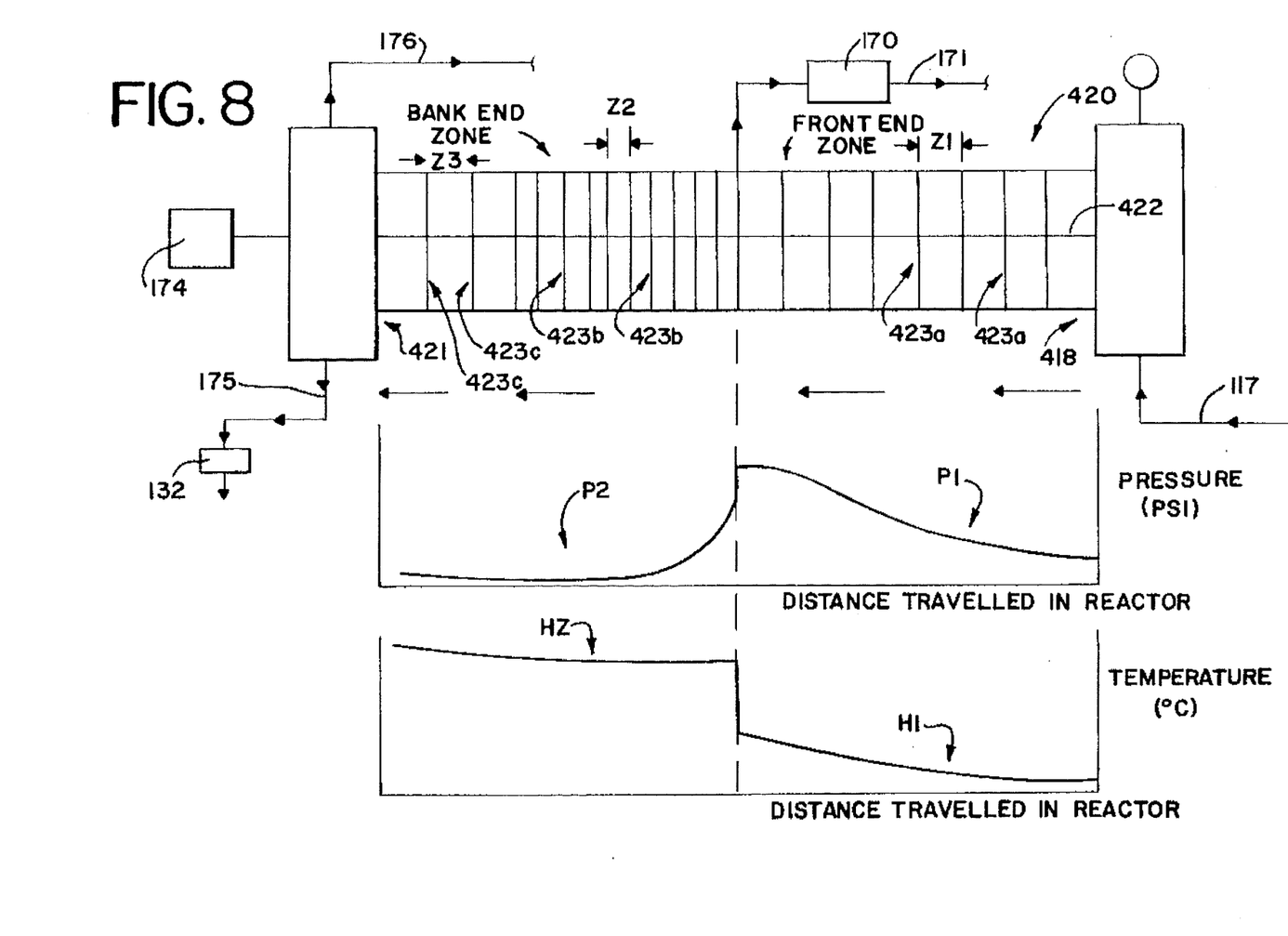

FIG. 8 shows a fourth embodiment, which combines the two reactors of the second embodiment (FIG. 2) into a single reactor 420. Similar reference numbers are used for similar components and, for clarity, most of the same hardware of the system is not shown. In this fourth embodiment, the fourth reactor 420 supplants the first and the second reactors 120,128. It, too, is constructed like the other reactors 120, 128,320 previously described in connection with FIGS. 2–7. It includes a cylindrical shell 220 having an input end 418 and an output end 421 and internal means for moving the slurry from the input end to the output end. The means for moving the slurry, like before, is an internal screw or auger 422,423. This auger has a central shaft 422 with an attached, variably spaced helical blade or flights 423. The screw or auger is driven by an external motor M4 attached to one end of the auger.

External heating means, such as helical heater wires 227 or gas tubes are wrapped around the cylindrical shell 220 of the fourth reactor 420 to heat the contents. A layer of insulation 228 is placed around the heater wires 227 and the shell 220 to reduce heat loss within the reactor.

At the input end of the reactor 420, there is a first input conduit 117 transporting the pumped process slurry into the reactor 420. Between the two ends 421,418 of the fourth reactor 420, there is, in an upper position, an opening and an escape valve 170 for permitting the controlled flow of vapor from the fourth reactor. This vapor, again generally comprised of both water and contaminants if water is used as a process liquid or of process liquid and contaminants if another process liquid is used, flows through the escape valve 170 and into a first branch of a steam conduit 171.

At the output end 421 of the fourth reactor 420 there is, in an upper position, an opening and an outlet conduit 176 for permitting the vapor oil to escape from the reactor. This vapor oil flows through the first branch of the outlet conduit 176 into a second branch of the outlet conduit (not shown in FIG. 8). In addition, at the output end 421, in the bottom of the reactor 420, there is an opening and bottom pipe 175 for permitting the solids which fall to the bottom of the reactor to continue their fall and be removed to a separate solids storing facility 132.

In place of a second flow valve 126 and a second slurry conduit 122 between two reactors, the pressure within the single reactor is controlled by the auger. The helical blade 423 attached to the shaft 422 is variably spaced. As shown schematically in FIG. 8, the spacing between the blades or flights varies. To increase the pressure on the process slurry in the reactor, the space between turns Z is decreased. To maintain such pressure on the slurry being moved, there must also be a seal (not shown) between the blade 423 and the inner surface of the reactor. This seal may be constructed and attached to the system or produced by carbon built up on the reactor surface and auger.

Thus, in the front end zone of the reactor where the spacing is Z1 between the turns of the blade 423a is relatively large, there is a first pressure P1 applied to the slurry. At a point between the two ends 418,421 of the reactor 420, the spacing Z2 between the turns of the blade 423b is deliberately smaller and the pressure P2 on the processing slurry increases (back end zone). This increase can be drastic. Accordingly, the pressure in the vessel in the slurry is a function of the spacing between the turns (the volume) of the auger blade and the temperature. As shown in FIG. 8, the spacing Z3 between the turns of the blade 423c may again be larger towards the output end of the reactor 420. The opening and an escape valve 170 for permitting the flow of vapor from the fourth reactor is positioned at this point where the change of pressure occurs.

As to the temperature, the external heating means, such as the helical heater wires 227 wrapped around the cylindrical shell 220 of the fourth reactor 420, may be two separate heating systems. In the front end zone of the reactor, the heat, or wires, are set to heat the slurry to a first temperature H1. In the back end zone of the reactor, the heat, or wires, are set to heat the slurry to a second, higher temperature H2.

FIG. 8 shows the relationship of the a heat or temperature of the process slurry v. distance travelled in the reactor in a graph and the pressure applied to the process slurry v. distance travelled in the reactor in a graph. The slurry again is received into the reactor and heated while the pressure applied to the slurry is increased in the front end zone. Between the ends of the reactor, the slurry enters a back end zone and the pressure applied to it is reduced and the heat applied to it is increased. At times, noted previously, the second temperature H2 of the slurry may be equal to the first temperature H1.

As with the earlier embodiments, the rate of flow of the slurry or emulsion in the reactors may be controlled by either the length of the fourth reactor (or the length of its parts, namely the back end zone and the front end zone) or by the motor speed of the motor M4 for the auger. Again, the rate of flow must be adequate to allow sufficient dwell time for the hydrolysis reaction under the pressure. The high pressure of the low-temperature-high-pressure LTHP portion of the processor (between the pumps (116), the first slurry conduit (117), the fourth reactor 420 and the point of transition between the front end zone and the back end zone (change in pressure between the zones and turn spacing Z1,Z2). It is in this LTHP portion of the system that the process slurry becomes hydrated or saturated with the process liquid. The operating parameters of temperature, pressure, flow velocity and dwell time must be balanced to produce and permit proper saturation or hydration.

The portion of the system including the back end zone is the high-temperature-low pressure (HTLP) portion of the processor. The drop in the pressure combined with the sharp increase in the temperature within the back end zone causes the slurry to reform into a first by-product comprised of solids and at least one second by-product comprised of volatile gas and liquid oils (hydrocarbons).

The rate of flow of the slurry or emulsion may again be controlled by either the length of the reactor or by the motor speed of the motor M4 for the auger. The rate of flow must be adequate to allow sufficient dwell time for the reaction or reformation. The operating parameters of temperature, pressure, flow velocity and dwell time must be balanced to produce and permit this reaction or reformation.

Finally, while the reactors have been shown to include augers and screws, for certain materials and large volumes thereof, it may be preferable to use a materials belt or conveyer to move the material from one end to the other end of a reactor. Even though a conveyer is used, both heat and pressure, as described above, may be applied to the emulsion or slurry.

While the specific embodiments have been illustrated and described, numerous modifications come to mind without significantly departing from the spirit of the invention and the scope of protection is only limited by the scope of the accompanying claims.

I claim:

1. A process for converting a process material into other useful products, comprising the steps of:
   a) mixing the process material with a process liquid to create a flowable slurry,
   b) pumping said slurry to a container while preheating said slurry,
   c) further reducing the pressure on said slurry in said container while further heating said slurry to separate vapor by-products from solids in said slurry,
   d) collecting said vapor by-products, and
   e) collecting said separated solids.

2. A process as set forth in claim 1, including the step of increasing said pressure on said separated vapor by-products while cooling said separated vapor by-products to produce separate components.

3. A process for converting a process material into other useful products, comprising the steps of:
   a) mixing the process material with a process liquid create flowable slurry;
   b) heating said slurry to a first preestablished temperature and applying a first pressure to said slurry;
   c) reducing said pressure applied to said slurry from said first pressure to a second pressure while heating said slurry from said first preestablished temperature to a second preestablished temperature and reforming said slurry into a first by-product and at least one-second by-product, said second pressure being less than said first pressure;
   e) collecting said first by-product; and,
   f) collecting said second by-product.

4. The process of claim 3 including the step of cooling said second by-product and separating said second by-product into at least one-third by-product and at least one-fourth by-product.

5. A processor for converting a process material into other use products comprising:
   a) a mixer means for mixing the process material with a process liquid and for forming a flowable slurry;
   b) a system means connected to said mixer means for receiving and (i) heating and increasing the pressure applied to said slurry followed by (ii) reducing said pressure applied to said slurry and further heating and reforming said slurry into a first by-product and at least one-second by-product;
   d) a first collection means for receiving said first by-product from said second system means; and,
   e) a second collection means for receiving said second by-product from said second system means.

6. The processor of claim 5 wherein said second collection means includes:
   a) a second system means connected to said system means for receiving, cooling and increasing said pressure applied to said second by-product, and for separating said second by-product into at least one-third by-product and at least one-fourth by-product; and, b) a third collection means for receiving said fourth by-product from said second system means.

7. The processor of claim 6 wherein said third collection means includes:

a) a third system means connected to said second system means for receiving and separating said third by-product into at least one-fifth by-product and at least one-sixth by-product;

b) a fourth collection means for receiving said fifth by-product from said third system means; and, c) a fifth collection means for receiving said sixth by-product from said third system means.

8. A processor for converting a process material into other useful products comprising:

a) blending means adapted for receiving the process material, receiving a process liquid and mixing the process material with said process liquid to form a flowable emulsion, said blending means being a hopper connected to a material input conduit adapted for preheating the process material and a liquid tank connected to a liquid input conduit, a mixer having two input openings, each connected to a one of said material input conduit and said liquid input conduit, and one output opening connected to a first slurry conduit;

b) first system means connected to said blending means adapted for receiving, heating to a first preestablished temperature and applying a first pressure to said emulsion;

c) second system means connected to said first system means for receiving and reducing said pressure applied to said emulsion from said first pressure to a second pressure, for heating said emulsion from said first preestablished temperature to a second preestablished temperature and for reforming said emulsion into a first by-product and at least one-second by-product, said second pressure being less than said first pressure;

f) first collection means for receiving said first by-product from said second system means; and, g) second collection means for receiving said second by-product from said second system means, said second collection means including third system means connected to said second system means for receiving and cooling said second by-product and for separating said second by-product into at least one-third by-product and at least one-fourth by-product.

9. A processor for converting a process material into other useful products comprising:

a) blender means adapted for receiving the process material, receiving a process liquid and mixing the process material with said process liquid to form a flowable emulsion or slurry;

b) system means adapted for (i) heating said slurry or emulsion to a first preestablished temperature and applying a first pressure to said slurry or emulsion followed by (ii) reducing said pressure applied to said slurry or emulsion from said first pressure to a second pressure and heating said slurry or emulsion from said first preestablished temperature to a second preestablished temperature so as to reform said slurry or emulsion into a first by-product and at least one-second by-product, said second pressure being less than said first pressure;

c) a first collection means for receiving said first by-product from said system means; and, d) a second collection means for receiving said second by-product from said system means.

10. The processor of claim 9 wherein said second collection means includes a condenser connected to said system means adapted for receiving and cooling said second by-product and for separating said second by-product into at least one-third by-product and at least one-fourth by-product.

11. The processor of claim 10 wherein said blender means is a hopper connected to a material input conduit, adapted for preheating the process material and a liquid tank connected to a liquid input conduit, a mixer having two input openings, each connected to a one of said material input conduit and said liquid input conduit, and one output opening connected to a first slurry conduit.

12. A processor for converting a process material into other useful products comprising:

a) a hopper connected to a material input conduit adapted for receiving the process material;

b) a liquid tank connected to a liquid input conduit for receiving a process liquid;

c) a mixer adapted for mixing the process material with said process liquid to form a flowable slurry or emulsion having two input openings, each connected to one of said material input conduit and said liquid input conduit, and one output opening connected to a first slurry conduit, said first slurry conduit being adapted for preheating said slurry or emulsion;

d) a pump adapted means for moving said slurry or emulsion through said first slurry conduit to a reactor, e) said reactor adapted for (i) receiving, heating to a first preestablished temperature and applying a first pressure to said slurry or emulsion followed by (ii) reducing said pressure applied to said slurry or emulsion to a second pressure, heating said slurry or emulsion from said first preestablished temperature to a second preestablished temperature and reforming said slurry or emulsion into a first by-product and at least one-second by-product, said second pressure being less than said first pressure;

f) a first collection means for receiving said first by-product from said reactor; and, g) a condenser connected to said reactor adapted for receiving and cooling said second by-product and for separating said second by-product into at least one-third by-product and at least one-fourth by-product.

13. A processor for converting a process material into other useful products comprising:

a) a hopper connected to a material input conduit adapted for receiving the process material;

b) a liquid tank connected to a liquid input conduit for receiving a process liquid;

c) a mixer adapted for mixing the process material with said process liquid to form a flowable slurry or emulsion having two input openings, each connected to one of said material input conduit and said liquid input conduit, and one output opening connected to a first slurry conduit, said first slurry conduit being adapted for preheating said slurry or emulsion;

d) a pump adapted means for moving said slurry or emulsion through said first slurry conduit to a reactor, e) said reactor adapted for (i) receiving, heating to a first preestablished temperature and applying a first pressure to said slurry or emulsion followed by (ii) reducing said pressure applied to said slurry or emulsion to a second pressure, heating said slurry or emulsion from said first preestablished temperature to a second preestablished temperature and reforming said slurry or emulsion into a first by-product and at least one-second by-product, said second pressure being less than said first pressure, f) said reactor being a cylindrical shell and said means for moving said slurry from said input end to said output end being an internal auger having variably spaced blades thereon;

g) a first collection means for receiving said first by-product from said reactor; and, h) a condenser connected to said reactor adapted for receiving and cooling said second by-product and for separating said second by-product into at least one-third by-product and at least one-fourth by-product.

14. The processor of claim 13 including a grinder adapted for grinding the process material before the process material is transported to said reactor and a strainer adapted for straining the process material before the process material is transported to said reactor.

* * * * *

UNITED STATES PATENT AND TRADEMARK OFFICE
CERTIFICATE OF CORRECTION

PATENT NO. : 5,543,061
DATED : August 6, 1996
INVENTOR(S) : Paul T. Baskis

It is certified that error appears in the above-indentified patent and that said Letters Patent is hereby corrected as shown below:

The reference Patent No. for the term limit is incorrect and should be "Pat. No. 5,360,553."

Signed and Sealed this

Twenty-seventh Day of May, 1997

Attest:

BRUCE LEHMAN

Attesting Officer

Commissioner of Patents and Trademarks